Patented Jan. 2, 1951

2,536,579

UNITED STATES PATENT OFFICE 2,536,579

CHLORINATION OF RUBBER-FATTY ACID MIXTURES

Charles Heintz Sommer, Issy-les-Moulineaux, France

No Drawing. Application January 29, 1947, Serial No. 725,175. In the Netherlands August 18, 1939

5 Claims. (Cl. 260—772)

My invention relates to a new composition of matter suitable as a base material for the manufacture of lacquers, linoleum, artificial resins, artificial leather, pressed materials and like products.

One of the objects of my invention is the provision of a base material for the lacquer industry, yielding lacquers having an excellent adhesive power, beautiful gloss and a particular smoothness.

Another object of my invention is a product showing likeliness to factice and which may wholly or partially replace linoxyne in the linoleum industry.

Other objects of my invention will be clear by reading this specification and the examples.

My invention includes the process for the preparation of this new composition of matter.

The new composition of matter of my invention consists in a product obtained by subjecting rubbery material to a thermic treatment at high temperatures until the weight has decreased by 3 to 35% and incorporating the product in a fatty material before, during or after the thermic treatment. This heating temperature must be at least 230° C. and preferably more than 250° C., but not so high that the rubbery product is completely cracked. In general temperatures higher than 350° C. should be avoided and I prefer heating temperatures between approximately 260 and 290° C.

The heating period depends largely on the heating temperature, lower temperature needing a longer heating period than higher temperatures. In general it is sufficient to bring the mass at 260 to 290° C. in order to obtain the desired result.

By rubbery material is meant in the first place unvulcanized rubber, crepe rubber as well as sheet rubber and further synthetic rubbers or rubber-like substances, such as balata, gutta-percha, gelutong, chica and the like or mixtures of these substances.

Fatty materials suitable for yielding the product of my invention by mixing with the heat treated rubbery material or by heating these materials together with the said rubbery material are animal and vegetable fats and oils, such as olive oil, nut oil, fish oil, ricinic oil, linseed oil and the like, fats, such as cocoanut fat, animal fats, etc., and the fatty acids obtained from these oils or fats.

Particularly suitable are fats or oils of the fatty acids obtained therefrom, which are substantially saturated, i. e. which possess a low iodine value. A better indication, however, for the present purpose is the increase in temperature obtained by mixing equal parts of the fatty material with 100 percent sulphuric acid. In general a fatty material, given by mixing with 100% H$_2$SO$_4$ at a temperature not higher than 100° C. is very suitable for the purpose of my invention.

It is possible that the more unsaturated fatty materials, giving a temperature rise to more than 100° C. on mixing with sulphuric acid are less suitable because they polymerise too strongly on heating with the rubbery material.

The proportion of rubbery and fatty material is such that the quantity of rubbery material is 30–90% and preferably, 60–80% of the total weight of these materials in the mixture. The proportion of fatty material in the mixture only results in differences in degree, but not in differences in principle since the eventual film obtained therefrom maintains its good qualities while showing a greater suppleness with increasing proportions of fatty material.

Though I prefer heating the rubber and fatty material per se, indifferent media, such as solvent for the rubber and for fat may be present.

The new composition of matter according to my invention comprising heated rubbery material incorporated in fatty material surprisingly shows properties making this composition comparable to polymerising fats and resinous substances though they have particular characteristics due to the nature of the materials started from. The rubber-fat heating products possess namely drying properties, albeit only in a feeble degree. These drying properties make my composition suitable as a valuable base material in lacquer and linoleum industry. The drying of my composition may be speeded up in the usual way by incorporating siccatives, such as cobalt resinate, manganese linoleate, etc., in my composition.

By repeatedly heating the rubbery and fatty materials at temperatures above at least 230° C. and preferably 260° C. though in general not higher than about 350° C. the heating products polymerise and hereby the drying properties are improved.

Of particular importance, however, is the improvement obtained by causing the rubbery-fatty heating products, polymerised or not to react with an oxidizing agent, such as oxygen, oxygen yielding agents, one or more halogens, sulphur chloride, chlorosulphonic acids, sulphuric acid, organic sulphonic acid chlorides or nitric acid and like active agents. In this way film forming substances are obtained, which according to the proportion and the nature of the agents used are solid, liquid or of colloid nature. E. g. a rubbery-fatty heating product, treated with 10% by weight of sulphuric acid is liquid and only gives a solid lacquer film after long exposure to the air, whereas the same rubbery-fatty heating product, converted by means of 30% by weight of sulphuric acid, is in solid aggregation state, but equally undergoes polymerisation when exposed to the air, which polymerisation evidently does not appear from a change in the state of aggregation, but in the first place from the behaviour of the film with respect to water and to organic solvents.

The treatment of the rubbery-fatty heating product by means of said activating agents is preferably executed in solution by dissolving the rubbery-fatty heating product in suitable solvents, such as carbon tetrachloride, toluene, dichloro aethane.

The films obtained from rubbery-fatty heating products, activated in the above indicated way excel by a great adhesive power to the underlayer, a beautiful gloss and a particular smoothness.

The rubbery-fatty heating product converted by means of sulphurchloride shows likeliness to factice and may be worked up between rollers, thus replacing wholly or partially linoxyne in the linoleum industry.

The rubbery-fatty heating products, treated with activating agents, possess the important property that they can be easily emulsified in water before polymerisation has taken place. After polymerisation they are totally indifferent to water.

The solid activated rubbery-fatty products may be allowed to swell in boiling water up to 20 times their own weight depending on the nature and composition of the rubber-fat conversion product. The water taken up cannot be removed by pressure. After removing the water by evaporation the product is still thermoplastic. This plastification only takes place at temperatures above 200° C. so that the products prepared by this embodiment of my invention are in the first place suitable for pressing masses.

My invention is illustrated but not restricted by the following examples.

Example 1

50 parts by weight of crepe rubber and 50 parts by weight of linseed oil are heated at 240° C. and kept at this temperature for about four hours. A homogeneous viscous mass results. To this mass the solvents, usually triglycerides, can be added and a drying film is formed after spreading out, the drying properties of which can be improved by the addition of siccative.

Example 2

30 parts by weight of cocoanut fat are heated with 70 parts by weight of rubber at 270° C. and kept at this temperature for some minutes. It is established that the strong development of gas in the vicinity of 240 to 260° C. considerably decreases at rising temperature and even depending on the kind of rubber completely stops at 270° C. By this heating process a decrease of weight of about 8% calculated on the rubber results. A high viscous homogeneous mass is formed having weakly drying properties.

Example 3

The product according to Example 2 is cooled to 50° C. and then 8.8 parts by weight of sulphuric acid are added. A slow reaction takes place which can be accelerated by light heating.

The reaction product is a very viscous resin and can already be spread out with a brush after addition of 30 parts by weight of xylene. The drying properties are satisfying but they can, if necessary, be improved by the addition of siccative.

Example 4

The heating product obtained according to Example 3 is treated with 22 parts by weight of sulphuric acid instead of 8.8 parts by weight of sulphuric acid. A strong reaction begins the final result of which is a solid resin containing a certain excess of acid which after dissolving of the resin by means of a base can be neutralized.

Example 5a

From the resin obtained according to Example 3 a 40% toluene solution is made, neutralized with ammonia and water is added under stirring. The result is an emulsion of the type "water in oil" which after exposure to the air during 2 to 3 hours is practically indifferent to water. This emulsion allows an extraordinarily strong pigmentation. A mixture of 1 part by volume of resin and 20 parts by volume of pigment e. g. guarantees a sufficient bond.

Example 5b

If the emulsion from Example 5a is adjusted to a pH of approximately 16, an emulsion of the type "oil in water" is obtained by adding water under stirring. This emulsion can efficiently be stabilized by a protective colloid, such as casein, agar-agar, etc. Insofar the emulsion is sufficiently near the point of phase reversion this results very rapidly after spreading out so that the film then after a short time is indifferent to water.

Example 6

65 parts by weight of rubber coagulated from latex are heated to 250° C. with 35% of bovine fat and kept at this temperature for about 2 hours. Then 15% of sulphuric acid are added and the excess of acid is neutralized by hexamethylenetetramine.

After addition of a quantity of a dissolving agent such as benzene, toluene, or xylene necessary for the spreading capacity, a lacquer results of good sticking capacity which, however, is not water resistant until after a few days.

If this lacquer is, however, heated for about 20 minutes at about 200° C., a hard but very elastic film is obtained which is indifferent to the dissolving agents usual in the lacquer industry.

Example 7

The product obtained according to Example 2 is ground with sulphurchloride on a mill. A product results which can be excellently used as factice in the linoleum industry.

Example 8

40 parts by weight of olive oil are heated at 270° C. with 60 parts by weight of "smoked sheets" and are then immediately withdrawn from the influence of the temperature. The heating product so obtained is dissolved in carbontetrachloride and then a chlorine flow is passed through. After washing and neutralizing of the chlorination product obtained and after addition of a suitable dissolving agent as trichloroethane, xylene, etc., on spreading out, a lacquer of very good adhesive capacity, beautiful gloss and great resistance results which is indifferent to chemical reaction agents such as acids, alkalies, and solvents such as alcohol, gasoline and straight-chain hydrocarbons.

*Example 9*

Instead of a flow of chlorine, iodine or bromine are used which can be heated in solid form together with the heating product rubber-oil.

*Example 10*

To the product obtained according to Example 2 carbontetrachloride is added and an oxygen flow is then passed through the solution. The lacquer obtained in this way has a very great resistance to water.

*Example 11*

The heating product according to Example 2 is heated with 30% of nitric acid. A strong reaction results under development of $NO_2$. The product obtained can be dissolved in xylene and gives a dull film on spreading out.

*Example 12*

80 parts by weight of synthetic polyprene are heated at 250° C. during 4 hours with 20 parts by weight of lard.

The highly viscous mass obtained in this manner is treated during one hour with a 10% solution of caustic soda at boiling point. After neutralisation of the sodium hydroxide with a corresponding acid such as hydrochloric acid or sulphuric acid, the heating product remains very finely divided in hot water and precipitates in cold water. This product can efficiently be used for sticking paper.

Having now particularly described and ascertained the nature of my said invention what I claim is:

1. A process for preparing a composition of matter comprising: heating a mixture of rubber and a higher fatty acid containing material to a temperature between about 230° C. and 350° C. until the weight of the mixture has decreased between about 3% and 35%, dissolving the resulting product in a chlorine containing solvent compound, passing chlorine through said dissolved product, and separating the resulting chlorinated product to obtain a homogeneous stable resin.

2. The process of claim 1 wherein said heating takes place at a temperature between about 260° C. and 290° C.

3. The process of claim 1 wherein said mixture comprises from 30 to 90 parts by weight of said rubber and from 70 to 10 parts by weight of said fatty acid containing material.

4. A lacquer comprising the resin produced according to the process of claim 1.

5. A process for the preparation of a composition of matter comprising: preparing a mixture of 60 to 80 parts by weight of unvulcanized rubber and of 40 to 20 parts by weight of a fatty material selected from the group consisting of substantially saturated animal and vegetable fats and oils and their corresponding fatty acids, heating said mixture to a temperature between about 260° C. and 350° C. until the weight thereof has decreased between about 3% and 35%, dissolving the resulting product, washing the resulting chlorinated product with an aqueous solution, neutralizing said solution, and drying the resulting product to obtain a homogeneous stable mass.

CHARLES HEINTZ SOMMER.

REFERENCES CITED

The following references are of record in the file of this patent:

UNITED STATES PATENTS

| Number | Name | Date |
| --- | --- | --- |
| 146,387 | Finley | Jan. 13, 1874 |
| 2,001,582 | Parker | May 14, 1935 |
| 2,019,207 | Alexander | Oct. 29, 1935 |
| 2,120,393 | Crawford | June 14, 1938 |

FOREIGN PATENTS

| Number | Country | Date |
| --- | --- | --- |
| 3,121 | Great Britain | 1860 |
| 461,508 | Great Britain | Feb. 17, 1937 |